(12) United States Patent
Donahue

(10) Patent No.: US 7,739,746 B2
(45) Date of Patent: Jun. 15, 2010

(54) DOCUMENT CONTROL

(75) Inventor: James Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1046 days.

(21) Appl. No.: 11/243,811

(22) Filed: Oct. 4, 2005

(65) Prior Publication Data

US 2007/0078900 A1 Apr. 5, 2007

(51) Int. Cl.
*G06F 17/30* (2006.01)
(52) U.S. Cl. .............. 726/27; 726/26; 707/200
(58) Field of Classification Search ............ 707/200; 726/26–27; 713/176
See application file for complete search history.

(56) References Cited

U.S. PATENT DOCUMENTS

2006/0053168 A1* 3/2006 McDougall et al. ...... 707/104.1

OTHER PUBLICATIONS

"Adobe Policy Server FAQ". Aug. 2004. Available at http://everest.natur.cuni.cz/konference/2007/sponzori/adobe/produktove_info/EN/Policy_Server_FAQ.pdf. Downloaded Dec. 1, 2008.*

"Secure Electronic Documents Drive Efficient Online Business Processes". Aug. 2004. Available at http://www.adobe.com/products/server/pdfs/95003796_security_solbr_ue2.pdf. Downloaded Dec. 1, 2008.*

"A primer on electronic document security; How document control and digital signatures protect electronic documents" Nov. 2004. Available at http://www.adobe.com/security/pdfs/acrobat_security_wp.pdf. Downloaded Dec. 1, 2008.*

Adobe LiveCycle Policy Server 7.0 Portable Document Rights Language (PDRL) Specification; Feb. 2005; 50 pages; Adobe Systems Inc., San Jose, CA.

* cited by examiner

*Primary Examiner*—Nasser Moazzami
*Assistant Examiner*—Travis Pogmore
(74) *Attorney, Agent, or Firm*—Robert C Kowert; Meyertons, Hood, Kivlin, Kowert & Goetzel, P.C.

(57) ABSTRACT

Embodiments of methods, apparatuses, systems and/or devices for document control are described. For example, a document control policy may comprise a set of document control rules that may be applied to an electronic document. In one embodiment the policy may be at least partially represented by a language such as Portable Document Rights Language (PDRL), for example. PDRL, in at least one embodiment comprises a language that may be utilized for expressing the rights and conditions of a document control policy. A policy may be associated with one or more electronic documents, and may include a set of document control rules that may define rights associated with an electronic document, such as the right to access the electronic document by opening, editing, saving and/or printing the document, for example.

24 Claims, 4 Drawing Sheets

DOCUMENT CONTROL

BACKGROUND

Electronic documents may be protected. For example, an electronic document may be accessible by use of a communications network that may employ the Internet. The accessibility may be controlled, such as by controlling the capability to open, edit, save and/or print the electronic document, for example. Access to an electronic document may be controlled by applying a policy to the electronic document. A policy may comprise a set of document control rules that may define rights associated with an electronic document. For example, the rights may include rights granted to particular users, such as the right to access, edit, save and/or print the electronic document. Additionally, the set of document control rules may include a list of users that may be granted the rights, and/or may include a set of restrictions on how and/or when one or more rules may apply to an electronic document, for example. In one embodiment, a policy may be applied to multiple electronic documents. For a variety of reasons, it may be desirable to extend a policy to include additional features.

DESCRIPTION OF THE DRAWING FIGURES

The subject matter regarded as claimed subject matter is particularly pointed out and distinctly claimed in the concluding portion of the specification. Claimed subject matter, however, both as to organization and method of function, together with objects, features, and advantages thereof, may best be understood by reference to the following detailed description when read with the accompanying drawings in which:

Figure 1:
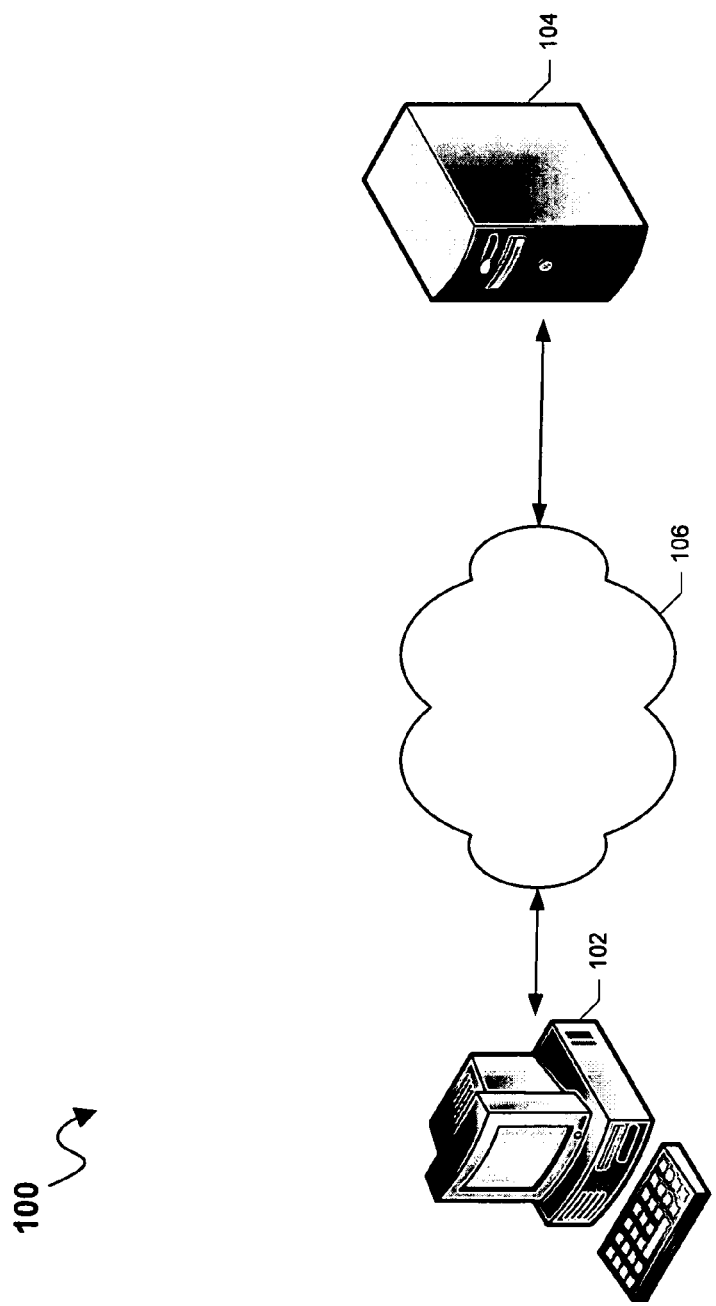
FIG. 1 is a schematic diagram of a system capable of controlling access to a document, in accordance with one or more embodiments.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail.

As mentioned previously, a policy may comprise a set of document control rules that may be applied to an electronic document. In one embodiment the policy may be at least partially represented by a language such as Portable Document Rights Language (PDRL), for example. PDRL, in at least one embodiment comprises a language that may be utilized for expressing the rights and conditions of a document control policy. Although PDRL may utilize one or more syntax formats, in at least one embodiment, PDRL may be expressed and/or represented in an Extensible Markup Language (XML). A policy may be associated with one or more electronic documents, and, as mentioned previously, may include a set of document control rules that may define rights associated with an electronic document, such as the right to access the electronic document by opening, editing, saving and/or printing the document, for example.

A policy may be associated with an electronic document by use of a license. A license may include identifying data for a user and/or an electronic document, and may associate an electronic document with a document control policy. A license may be granted to a user, and may associate the user with an electronic document, such that the user may perform functions with the electronic document in accordance with a policy. It may be desirable to enhance a document control policy to include additional data, such as a history of actions taken with the document, as one example. The additional data may further include archiving rules for an electronic document, and/or how and when the archiving rules were applied to the electronic document; indexing rules, metadata capture rules, and/or auditing rules, and/or how and when the rules were applied to the electronic document, to name a few examples. An enhanced document control policy such as this may provide a resource for determining how access to a particular electronic document is managed, and may additionally be utilized to audit the policy to determine whether particular rules were applied, how they were applied and/or when the rules may have been applied. This may be worthwhile, for example, if the electronic document is part of a compliance audit, such as part of a controls and procedures audit as part of a Sarbanes-Oxley compliance audit, in accordance with the Sarbanes-Oxley Act of 2002, for example.

Some portions of the detailed description that follows are presented in terms of algorithms, programs or the like and/or symbolic representations of functions on data bits or binary digital signals within a computer memory. These algorithmic descriptions and representations may be the techniques used in the data processing arts to convey the arrangement of a computer system or other information handling system to operate according to the programs.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system or other information handling system.

Embodiments may include apparatuses or systems for performing the functions herein. This apparatuses or systems may be specially constructed for the desired purposes, or it may comprise a general purpose computing device selectively activated or configured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device or other information handling system. Various general purpose systems may be used with programs in accordance with the teachings herein, or it may prove convenient to construct a more specialized apparatus to perform the desired method. The desired structure for a variety of these systems will be apparent from the description below. In addition, embodiments are not described with reference to any particular programming language. It will be appreciated that a variety of programming languages may be used to implement the teachings of claimed subject matter as described herein.

In the following description and claims, words or terms that connote a conditional occurrence with respect to time, such as when or upon, may mean at a particular instant in time and may also mean near a particular instant in time and may include times preceding the instant in time and times subsequent to the instant in time, for example after a delay period from the particular instant in time. In addition, where a publicly available or commonly utilized standard is discussed, any one or more promulgated versions of the standard may be suitable for any one or more embodiments, and may include prior versions, current versions, and/or future adopted versions.

An electronic document may be accessible, and accessibility may be controlled by a policy. The policy may define rights and conditions to provide and/or control one or more aspects of document accessibility, including using a software application to open the document, access to the document, to edit the document and/or by providing a list of users that are granted permission to perform functions such as these. Rights may be embodied in a policy such as a PDRL policy. A PDRL policy may be implemented by use of a computing device, such as a server. A server capable of implementing a PDRL policy may provide the capability to control and/or enforce document rights for an electronic document, such as by providing a gateway for a user to access an electronic document that may be controlled by a policy. In one embodiment a server that may be utilized to implement a policy for an electronic document may comprise an Adobe® LifeCycle™ Policy Server. One embodiment of an implementation of a server such as an Adobe® LifeCycle™ Policy Server is explained with reference to FIG. 1.

Electronic documents may additionally be managed by document management rules that may be applied in addition to a policy. For example, document management rules may include rules defining how an electronic document may be archived, and may include document retention rules and/or guidelines that may indicate a retention period for a document and/or how many copies to retain. Additionally, document management rules may include document indexing data, which may comprise data that indicates how a document may be indexed for later retrieval, such as types of metadata that may be utilized to index, and document archiving data. Document management rules such as these may be applied in a variety of ways, and may be applied by differing entities, such as differing servers. For example, an electronic document may be stored in an archiving server. The archiving server may include rules for archiving, such as how long to archive an electronic document. The electronic document may additionally be indexed, such that a search may be performed to locate the document. The electronic document may be indexed by an indexing server, and searches may be performed on the indexing server to identify the document. The indexing server may include rules for indexing, such as what portions of the electronic document to use for indexing. In this example, the various document management rules may be applied by differing servers, and there may not necessarily be a centralized manner to track the rules, including how they were applied, when they were applied and/or what rules were applied, as just a few examples. For a variety of reasons, it may be desirable to integrate and/or embody one or more aspects of document management with a document control policy, such as a PDRL policy, such that document management rules may be recorded as part of the PDRL policy, and/or such that historical application of the document management rules may be logged. Recording of one or more document management rules and/or logging application of the document management rules with a document control policy may provide a single source for performing compliance audits, such as the aforementioned Sarbanes-Oxley compliance auditing. A policy with recorded and/or logged data such as this may provide capabilities including tracking historical application of management rules as applied to an electronic document. However, it is worthwhile to note that the claimed subject matter is not so limited. Additionally, integration of document control in this manner may be better understood with reference to the accompanying figures.

Referring now to FIG. 1, there is illustrated a schematic diagram of a system that may be employed to perform document control. Illustrated in FIG. 1 is system 100. System 100 may comprise a plurality of devices 102 and 104, which may be logically coupled by use of a communications network 106. Communications network 106 may at least partially employ the Internet, for example, and the devices may comprise a portion of a network or a subnetwork. System 100 may comprise a local area network, wide area network, Ethernet network and/or a token ring network, as just a few examples. Devices 102 and 104 may be capable of exchanging data with one another, and the devices may include a modem, a network interface card or other component that may facilitate communication with one or more other devices according to one or more communication protocols. Devices 102 and 104 may comprise one or more types of computing systems, such as servers, personal computers, network blades, cell phones and/or hand held devices, for example. In one embodiment, device 102 may be referred to as a client, and device 104 may comprise servers. Server 104 may host web pages or perform other services, such as one or more document control functions, for example. In one embodiment, server 104 may host an Adobe® LifeCycle™ Policy Server, for example, and may be capable of implementing a document management policy for one or more resources, such as one or more electronic documents. Additionally, although not illustrated in detail, devices 102 and 104 may include one or more processing units or processors, one or more input/output devices, such as a display, a keyboard and/or a mouse, a graphical user interface (GUI), and/or one or more types of memory, such as static random access memory, dynamic random access memory, flash memory, and/or a hard drive, for example.

Figure 2:
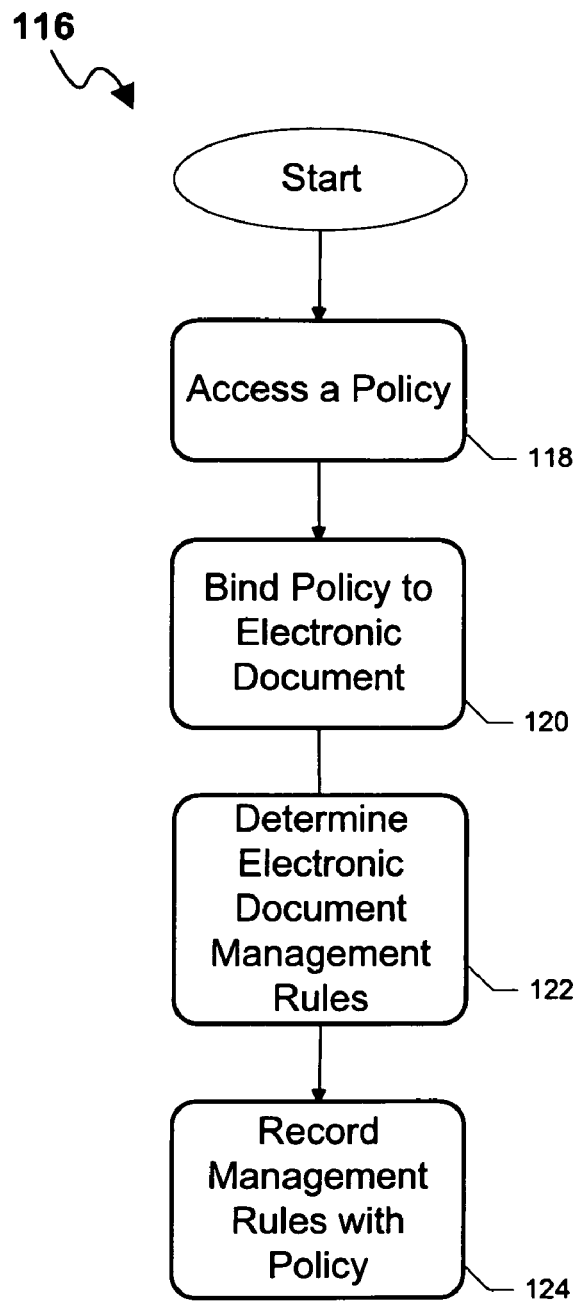
FIG. 2 is a flow diagram illustrating one embodiment of document control.

FIG. 2 is a flow diagram according to one embodiment of a process 116 for document control. However, for flow diagrams presented herein, the order in which the blocks are presented does not necessarily limit claimed subject matter to any particular order. Additionally, intervening blocks not shown may be employed without departing from the scope of claimed subject matter. Flow diagrams depicted herein may, in alternative embodiments, be implemented in a combination of hardware software and/or firmware, such as part of a computer system. In process 116, at block 118, a document control policy may be accessed. As stated previously, a document control policy may comprise a set of document control rules that may be associated with an electronic document. The rules may define, for example, rights and conditions for accessing and/or using an electronic document, such as described previously. The policy may identify a set of users that may access an electronic document, expiration of the policy and/or of the electronic document.

At block 120, the accessed policy may be applied to one or more electronic documents. Application of a policy to an electronic document may additionally be referred to as 'binding' the policy to the electronic document. In this embodiment, applying the policy to the electronic document may associate the electronic document with the policy, such that attempts to perform one or more functions with the electronic document may invoke the policy being accessed, determining whether the one or more functions are authorized in accordance with the policy.

The electronic document bound to the policy at block 120 may be associated with one or more document management rules. The document management rules may comprise archiving and/or retention rules, indexing rules and/or one or more additional management rules, such as described previously. The document management rules may be deployed on one or more devices, such as one or more servers, for example, wherein the servers may be operable to enforce the rules. At block 122, one or more document management rules for the electronic document may be determined. This may comprise accessing one or more rules that may be located on one or more servers, for example. At block 124, the document management rules may be recorded in a document control policy. Recording may comprise, for example, embodying and/or integrating at least a portion of the document management rules with the document control policy, such that the document control policy includes the document management rules as part of the policy, for example. However, in alternative embodiments, the document management rules may not be integrated into the policy, but may remain on one or more servers. In this example, the rules may be recorded in the policy but may not be enforced by the policy, for example. Recording the document management rules may additionally comprise logging the application of the rules in the policy. Logging may comprise recording what rules are applied, when they are applied, and/or how they are applied, such as time-based and/or historical application of rules, as just a few examples.

Figure 3:
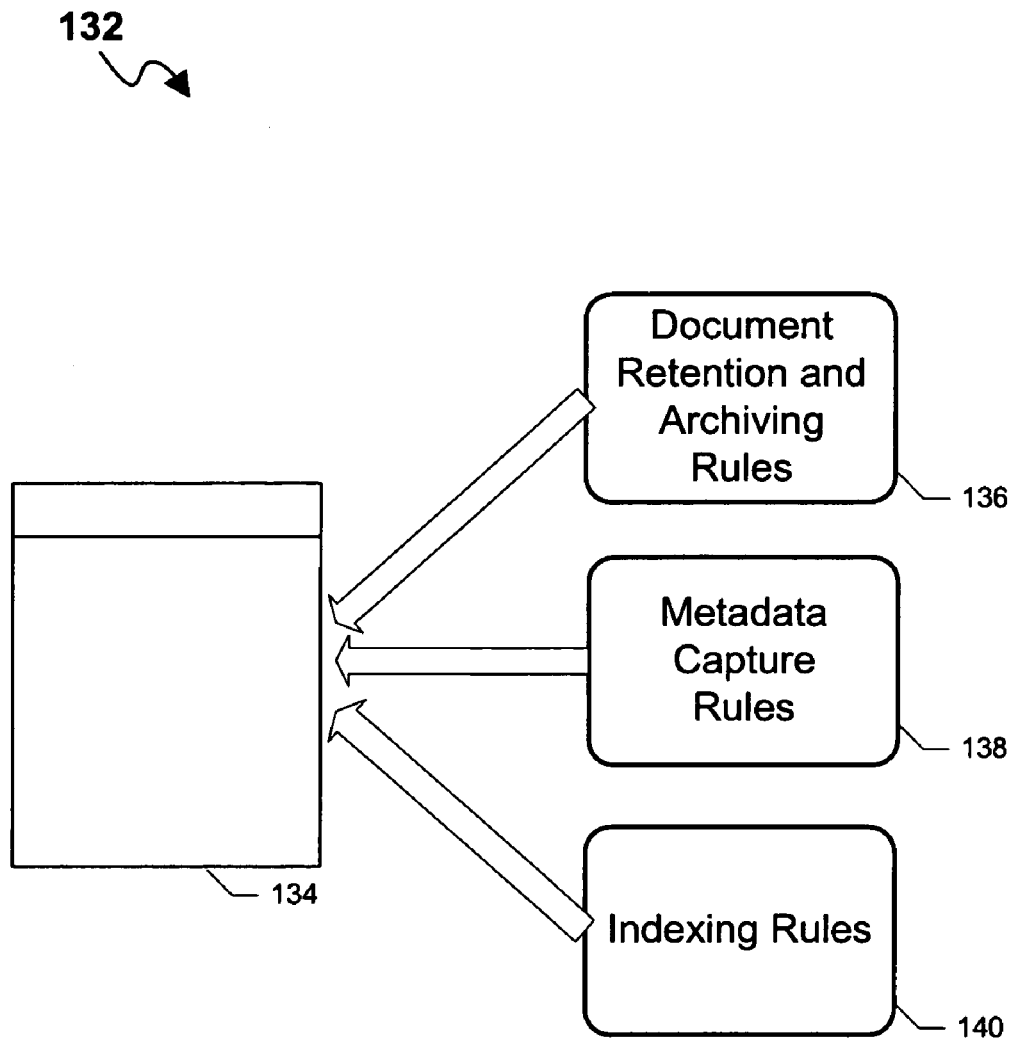
FIG. 3 is a schematic diagram of an electronic document with one or more rules applied to the electronic document, in accordance with one or more embodiments.

As mentioned previously, it may be desirable to record one or more aspects of document management in a document control policy, such as a PDRL policy, for example. FIG. 3 is a schematic diagram of an electronic document with one or more document management rules applied to the electronic document. In this embodiment, electronic document 134 may be managed at least in part by the document management rules. The document management rules may be enforced by one or more servers, as described previously. Electronic document 134 may additionally be associated with a policy. In this embodiment, the document management rules may be recorded as part of the policy. Recording the document management rules may additionally comprise recording the historical application of the rules in the policy, such as logging application of the rules based on time, to produce time-based data. Although the claimed subject matter is not so limited, in one embodiment the electronic document 134 may be formed in one or more data formats, such as in portable document file (PDF) format, for example. In this embodiment, one or more document control rules may comprise document retention and archiving rules 136, metadata capture rules 138 and indexing rules 140. Document retention and archiving rules may comprise rules that describe how to archive the electronic document, such as where to archive, what portions of the document to archive, and/or how many copies of the document to archive, but may also include retention rules, such as how long to archive the document. Metadata capture rules may comprise rules that describe what metadata may be captured from the electronic document, such as when a document was last saved, where it is saved and/or one or more other types of data that may be associated with an electronic document, for example. Indexing rules may comprise rules describing how an electronic document may be indexed (i.e. should the entire content of the document be indexed or should metadata be indexed).

One or more of the rules 136-140 may be recorded in the policy. For example, the rules 136-140 may be recorded on PDRL policy server 104 of FIG. 1, for example. In one embodiment, the policy may additionally include rights and/or conditions governing access of an electronic document. For example, a policy may include rights such as right to open to the document, edit the document and/or may provide a list of users that are granted permission to perform functions such as these, for example. As stated previously, a policy may be formed in one or more data formats, and in one embodiment may be expressed and/or represented in XML.

The policy may be accessible, and the access to the policy of an electronic document may be controlled such that portions of the policy are private and portions of the policy are public. In this context, a private part may comprise a portion of the policy that may be accessed by an authenticated user having permission to access the portion, and the portion may not be generally accessible or "public", for example. A public part of the policy may comprise a portion of the policy that may be generally accessible by non-authenticated user, For example, the private part of the policy may be accessible by authorized users. The public part of the policy may be accessed by non-authenticated users, for example. A policy may be accessed to determine the document control rights that may be included in the policy, and additionally may be accessed to determine which document management rules may be recorded in the policy and/or how the rules have been applied to an electronic document, for example. In one embodiment, the public part of the policy may include data such as the recorded document management rules, and/or how the rules were applied to an electronic document.

The public part and the private part may reside at least partially on a server, such as server 104 of FIG. 1. However, the public part may reside in a different location from the private part, in alternative embodiments. In one embodiment, one or more portions of rules 136-140 may be represented in the public part of a policy, although the claimed subject matter is not so limited. This may enable a third party non-authenticated user to perform particular functions such as auditing whether particular document management rules have been enforced, for example. Auditing may be performed for a variety of reasons, such as to ensure a policied document is being properly policied. In this context, a policied document comprises an electronic document that may be at least partially managed and/or controlled by use of a policy. This data may be accessible in the public portion of a policy, which may additionally enable auditing the document, wherein the auditing may be performed by non-authenticated users, for example.

Figure 4:
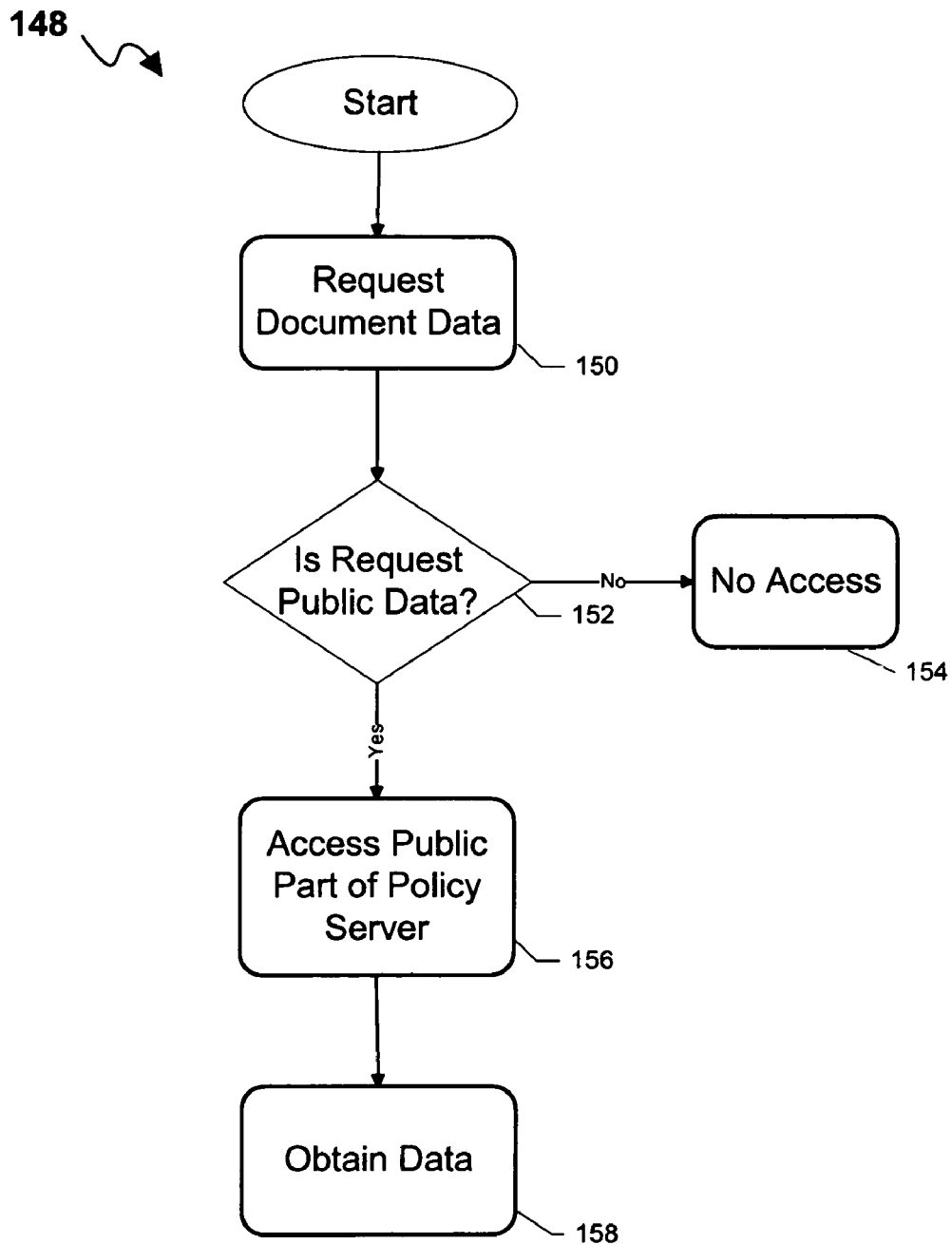
FIG. 4. is a block diagram illustrating a process of auditing an electronic document, in accordance with one or more embodiments.

Illustrated in FIG. 4 is a flow diagram 148, illustrating a process of auditing a policied document according to an embodiment. Auditing a document may be performed as part of a Sarbanes-Oxley audit, as mentioned previously. In a particular embodiment, at block 150, electronic document data may be requested. Electronic document data may comprise, for example, auditing data such as the document management rules that may have been applied to an electronic document, when the rules were applied and/or how they were applied, as just a few examples. Requesting the electronic document data may comprise accessing a server that may have data such as this represented therein. In one embodiment, the server may comprise a PDRL server, and may comprise a server such as server 104 of FIG. 1, for example. The requested data may be located as part of the document policy, such as in the public and/or private part of the policy, and may reside in one or more locations, such as two or more servers, for example.

Block 152 may determine whether the requested data is public data. In this context, public data may comprise data that may be represented in a public part of a PDRL server, for example. If the requested data is not public data, the request for the data may be denied, and no access to the data may be provided. However, if the data does comprise public data, at block 156, the public part of the PDRL server may be accessed. At block 158, the requested data may be obtained and provided in response to access granted at block 156. The returned data may comprise a record of the document management rules applied to a particular document, how the rules were applied and whether the rules were properly applied, as just an example. This may result in an audit of an electronic document. In one embodiment, process 148 may enable auditing the document control process. This may be utilized by a certified auditor, such as to ensure compliance with regulatory standards such as compliance with the Sarbanes-Oxley Act of 2002, as just an example. However, numerous other capabilities may be provided by implementing one or more portions of the flow diagrams presented herein.

It is now appreciated, based at least in part on the foregoing disclosure, that a combination of hardware, software and/or firmware may be produced capable of performing one or more of the functions as described herein. It will additionally be understood that, although particular embodiments have just been described, claimed subject matter is not limited in scope to a particular embodiment or implementation. For example, a system capable of implementing one or more of the foregoing functions may comprise hardware, such as implemented to operate on a device or combination of devices, for example, whereas another embodiment may be. in software and hardware, for example.

Likewise, an embodiment of a system capable of implementing one or more of the abovementioned functions may be implemented in firmware, or as any combination of hardware, software and/or firmware, for example. Additionally, all or a portion of one embodiment may be implemented to operate at least partially in one device, such as a display, a computing device, a cell phone, and/or a personal digital assistant (PDA), for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that, if executed by a system, such as a computer system, computing platform, a cell phone, a personal digital assistant (PDA), and/or other system, for example, may result in an embodiment of a method in accordance with claimed subject matter being executed, such as one of the embodiments previously described, for example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
   executing instructions on a special purpose computing apparatus to:
   access a document control policy, wherein the document control policy includes one or more document control rules, and the document control policy is associated with at least one electronic document;
   embody one or more document management rules in the document control policy; and
   assign access rights to the document control policy, to enable auditing of the document management rules, wherein auditing comprises detecting a time of application of one or more of the document management rules associated with an electronic document.

2. The method of claim 1, and further comprising executing additional instructions on a special purpose computing apparatus to log the application of one or more of the document management rules to an electronic document with said computer system.

3. The method of claim 2, wherein the application of one or more document management rules is logged in the document control policy.

4. The method of claim 1, wherein auditing comprises determining whether one or more of the document management rules were applied to an electronic document.

5. The method of claim 1, wherein the document management rules include: document retention rules, document archiving rules, document indexing rules, document metadata capture rules and/or combinations thereof.

6. The method of claim 1, wherein the document control rules include: data identifying one or more users having permission to access the document and/or data identifying one or more functions that may be performed by the one or more identified users.

7. The method of claim 1, wherein said auditing further comprises determining with said special purpose computing apparatus at least two of: whether one or more document management rules were applied to an electronic document, a time associated with application of one or more document management rules to an electronic document, and which particular document management rules were applied to an electronic document.

8. The method of claim 1, wherein the access rights provided to the document control policy comprise access to a portion of the policy for auditing.

9. The method of claim 1, wherein the document control rules and document management policy reside on a policy server.

10. The method of claim 1, wherein at least a portion of the document control rules and document management policy are formed in Portable Document Rights Language (PDRL).

11. A method of auditing an electronic document, comprising:
    executing instructions on a special purpose computing apparatus to:
    access a special computing apparatus executing one or more instructions associated with policy server functions, wherein the policy server includes one or more document management rules;

identify an electronic document associated with the one or more document management rules; and obtaining a record of document management rules as applied to the identified electronic document, wherein the record includes time-based data, and wherein the time-based data comprises a history of application of the document control rules to the identified electronic document.

12. The method of claim 11, wherein the document management rules include: document retention rules, document archiving rules, document indexing rules, document metadata capture rules and/or combinations thereof.

13. The method of claim 11, wherein at least a portion of the document management policy is formed in Portable Document Rights Language (PDRL).

14. The method of claim 13, wherein at least a portion of the PDRL is embodied in Extensible Markup Language (XML) format.

15. A policy server, comprising: a one or more processors executing one or more instructions adapted to control access to an electronic document according to a policy, the policy comprising: one or more document management rules for the electronic document; one or more document control rules for the electronic document; and one or more access rights assigned to the document management rules and the document control rules, wherein at least a portion of the document control rules and document management policy are formed in Portable Document Rights Language (PDRL).

16. The policy server of claim 15, wherein the access rights assigned to the document management rules and the document control rules differ.

17. The policy server of claim 15, wherein the access rights assigned to the document control rules comprise public access rights.

18. The policy server of claim 15, wherein the access rights assigned to the document management rules comprise authenticated user access rights.

19. The policy server of claim 15, wherein the document control rules include: document retention rules, document archiving rules, document indexing rules, document metadata capture rules and/or combinations thereof.

20. An article comprising: computer readable medium having stored thereon instructions that, if executed by one or more processors, enable said one or more processors to:

access a document control policy, wherein the document control policy includes one or more document control rules, and the document control policy is associated with at least one document;

embody one or more document management rules in the document control policy; and assign access rights to the document control policy, to enable auditing of the document management rules, wherein said auditing comprises determining a time associated with application of one or more document management rules were applied to a document.

21. The storage medium of claim 20, wherein the instructions, if executed by said one or more processors, further enable said one or more processors to log the application of one or more of the document management rules to an electronic document.

22. The storage medium of claim 20, wherein the instructions, if executed by said one or more processors, further enable said one or more processors to log an application of one or more document management rules in the document control policy.

23. The storage medium of claim 20, wherein the instructions, if executed by said one or more processors, further enable said one or more processors to provide access rights to the document control policy comprising public access rights for auditing.

24. The storage medium of claim 20, wherein the instructions, if executed by said one or more processors, further enable said one or more processors to cause the document control rules and document management policy to reside on a policy server.

* * * * *